(12) United States Patent
Watanabe

(10) Patent No.: US 8,036,003 B2
(45) Date of Patent: Oct. 11, 2011

(54) SWITCHING POWER SUPPLY DEVICE AND ELECTRICAL APPARATUS USING THE SAME

(75) Inventor: Yasuyuki Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/359,419

(22) Filed: Jan. 26, 2009

(65) Prior Publication Data

US 2009/0189582 A1    Jul. 30, 2009

(30) Foreign Application Priority Data

Jan. 28, 2008   (JP) ................ 2008-015995

(51) Int. Cl.
*H02H 7/122* (2006.01)
*H02M 7/10* (2006.01)

(52) U.S. Cl. .......... 363/50; 363/56.09; 363/49

(58) Field of Classification Search ......... 363/20–21.18, 363/50–56.12, 49; 323/901; 361/91.1
See application file for complete search history.

(56) References Cited

U.S. PATENT DOCUMENTS

| | | | | |
|---|---|---|---|---|
| 6,388,902 B1 * | 5/2002 | Yasumura | ............ | 363/21.02 |
| 7,023,679 B2 * | 4/2006 | Tomiyama | ............ | 361/91.1 |
| 7,248,485 B2 * | 7/2007 | Hermann et al. | ............ | 363/20 |
| 7,310,251 B2 * | 12/2007 | Yang et al. | ............ | 363/56.09 |
| 7,746,671 B2 * | 6/2010 | Radecker et al. | ............ | 363/21.03 |

FOREIGN PATENT DOCUMENTS

| | | |
|---|---|---|
| JP | 10-225112 | 8/1998 |
| JP | 11-252907 | 9/1999 |
| JP | 2000-156972 | 6/2000 |
| JP | 2003-174769 | 6/2003 |
| JP | 2003-174774 | 6/2003 |
| JP | 2003-348836 | 12/2003 |
| JP | 2007-116873 | 5/2007 |

* cited by examiner

*Primary Examiner* — Jessica Han
(74) *Attorney, Agent, or Firm* — Antonelli, Terry, Stout & Kraus, LLP.

(57) ABSTRACT

The present invention provides a switching power supply device capable of automatically restarting an electrical apparatus without a user operation when a voltage of the electrical apparatus or an operation of the electrical apparatus is abnormal. The switching power supply device is provided with a short-circuiting switch for a shunt regulator included in the feedback circuit. When an abnormal condition occurs in a secondary side circuit, the short-circuiting switch is turned on by means of a control signal to reduce a voltage of a primary side auxiliary winding and temporarily stop an operation of a primary side control circuit and of a switching element. A primary side capacitor continues to be charged by a power supply through a starting resistor. The primary side control circuit and the switching element automatically restart to operate.

7 Claims, 5 Drawing Sheets

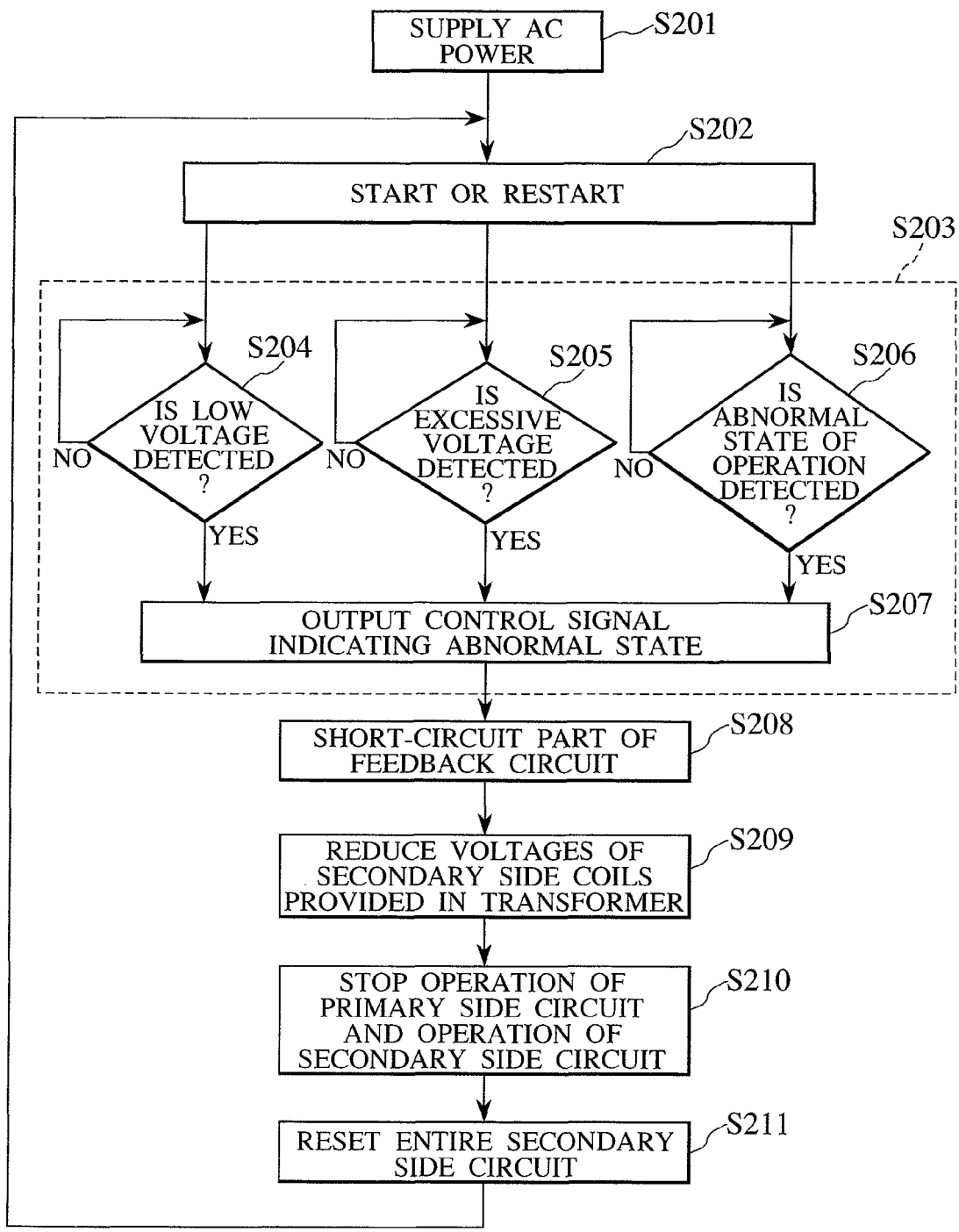

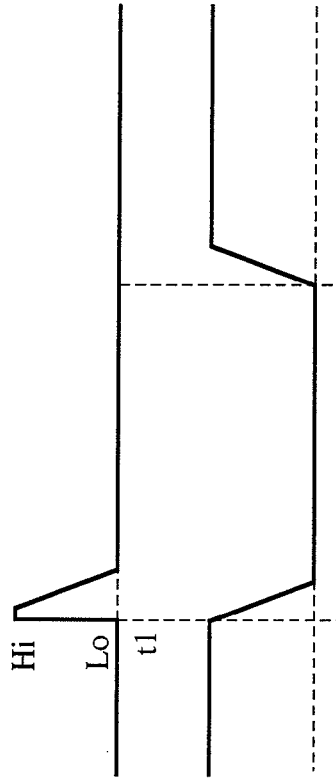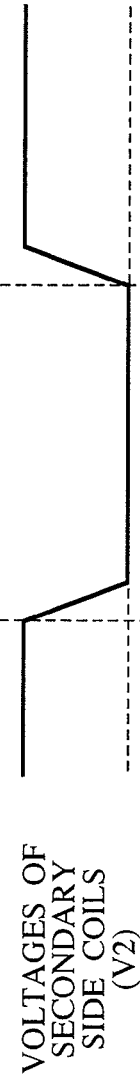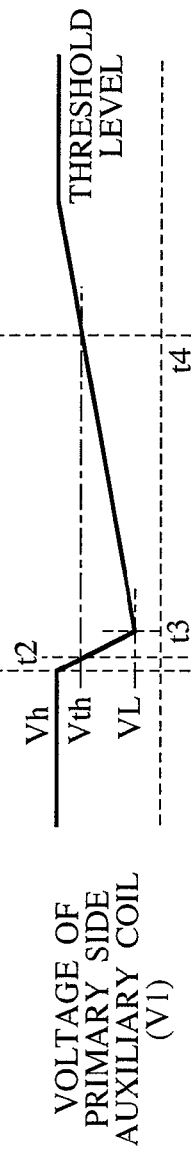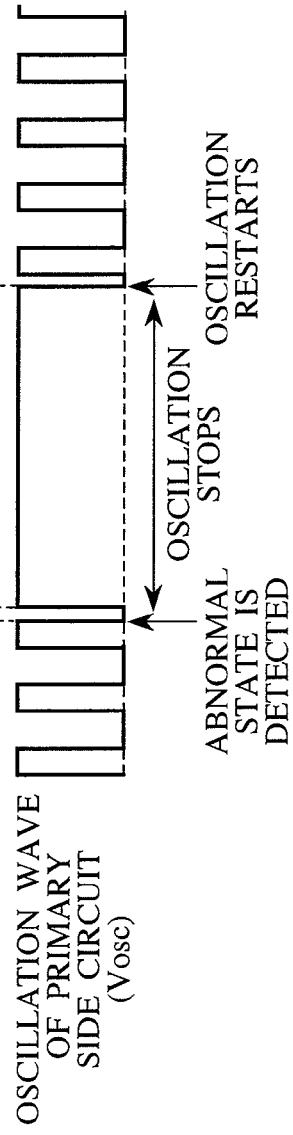
FIG. 3A CONTROL SIGNSL (Vc)
FIG. 3B CATHODE VOLTAGE (Vk)
FIG. 3C VOLTAGES OF SECONDARY SIDE COILS (V2)
FIG. 3D VOLTAGE OF PRIMARY SIDE AUXILIARY COIL (Vl)
FIG. 3E OSCILLATION WAVE OF PRIMARY SIDE CIRCUIT (Vosc)

SWITCHING POWER SUPPLY DEVICE AND ELECTRICAL APPARATUS USING THE SAME

CLAIM OF PRIORITY

The present application claims priority from Japanese patent application serial No. JP-2008-015995, filed on Jan. 28, 2008, the content of which is hereby incorporated by reference into this application.

BACKGROUND OF THE INVENTION

1. Field of the Invention

The present invention relates to a switching power supply device for supplying a voltage to an electrical apparatus, and more particularly to a technique for automatically recovering the electrical apparatus when a circuit of the electrical apparatus is abnormal.

2. Description of the Related Art

It is general that an electrical apparatus with an AC power supply uses a switching power supply device, the switching power supply device having a switching element and a transformer to perform AC-DC conversion, to supply power to a circuit provided in the electrical apparatus. The switching power supply device is configured with a photocoupler to feed back a voltage deviation from a secondary side circuit to a primary side circuit in order to stabilize an output voltage.

A switching power supply device for supplying power to an integrated circuit provided in an electrical apparatus performs control to stop oscillation of a switching element provided in a primary side circuit when a secondary side output voltage is abnormal, in order to prevent the integrated circuit from being broken. For example, in a technique described in JP-A-10-225112, when an output voltage is excessive, an input terminal of a photocoupler provided for a feedback circuit is grounded to control a primary side oscillation circuit thereby stopping oscillation of the primary side oscillation circuit. After the cause of the excessive voltage is removed, a control signal for restart of the oscillation is transmitted to restart the oscillation.

In addition, in a technique described in JP-A-2000-156972, when a photocoupler provided for a feedback circuit fails to cause an output voltage of a switching power supply device to abnormally increase, an input terminal of the photocoupler provided for the feedback circuit is grounded to stop oscillation of a primary side oscillation circuit in a similar manner to the technique described in JP-A-10-225112. In this case, since the cause is derived from the failure of the circuit part (photocoupler), it is necessary to cut off AC power and repair the circuit part.

SUMMARY OF THE INVENTION

When the secondary side output voltage is abnormal, it is necessary that the switching power supply device controls the primary side circuit through some method to perform a protective operation for protecting the part of the secondary side circuit and ensuring safety of the apparatus. The technique described in JP-A-10-225112 can reduce a feedback current (in the feedback circuit adapted to feed back an output voltage from a secondary side circuit to a primary side circuit) to a level lower than a normal level to stop an oscillation operation performed in the primary side circuit and perform a protective operation.

However, in the technique described in JP-A-10-225112, after the output voltage becomes excessive and the oscillation of the primary side circuit stops, the stop state continues unless a control signal (control signal for restarting the oscillation) for recovering the oscillation from the stop state is transmitted from the secondary side circuit. Even when the abnormal state is temporary, the stop state continues unless the control signal is transmitted from the secondary side circuit. In such cases, a user needs to turn on and off the AC power supply to restart and restore the electrical apparatus. The electrical apparatus does not always operate under the condition that the user stays near the electrical apparatus. In addition, there are many cases where the electrical apparatus operates without an operator while a timer function of the electrical apparatus is used. If the apparatus operating without an operator unexpectedly stops and the stop state continues, this provides users with not only inconvenience for use but also not a little loss.

A circuit included in an electrical apparatus that has recently been produced is mainly composed of an integrated circuit (IC) such as an LSI and a memory. In order to reduce power consumed by the electrical apparatus, a voltage required for an operation of the IC has been reduced. Therefore, the voltage required for the operation of the IC is easily affected by a natural environment such as a surge voltage caused by thunder and noise coming from an external device. As a result, the electrical apparatus may be inoperative due to a latch action of the IC. In the technique described in JP-A-10-225112, only when the output voltage is abnormal, the protective operation is performed. When the operation of the electrical apparatus is abnormal due to another cause, the protective operation is not performed.

In the technique described in JP-A-2000-156972, when an insulating element such as the photocoupler used for the feedback circuit fails, the switching power supply device stops. However, this technique requires a part such as an operational amplifier and a logical circuit resulting in a complex configuration and an increase in the cost.

An object of the present invention is to provide a switching power supply device of an electrical apparatus. The switching power supply device has a simple configuration and is capable of causing the electrical apparatus to automatically restart to operate without a user operation when a secondary side output voltage is abnormal or when an operation of a secondary side circuit is abnormal.

The switching power supply device according to the present invention comprises: a switching element which performs an on-off operation to turn on and off a direct current voltage to be applied to a primary side main winding; a primary side control circuit which controls the on-off operation of the switching element; a transformer having the primary side main winding, a secondary side winding and a primary side auxiliary winding, the secondary side winding being adapted to induce a voltage that is to be rectified and output to a secondary side circuit from the switching power supply device, the primary side auxiliary winding being adapted to supply a power supply voltage to the primary side control circuit; a feedback circuit which transmits a deviation of the voltage induced by the secondary side winding to the primary side control circuit; and a short-circuiting switch which short-circuits a part of the feedback circuit. The short-circuiting switch is provided for a shunt regulator included in the feedback, for example. When an abnormal condition occurs in the secondary side circuit, the short-circuiting switch is changed to an ON state to reduce a voltage induced by the primary side auxiliary winding and stop an operation of the primary side control circuit and of the switching element.

The switching power supply device may further comprise a starting resistor which transfers an input power supply voltage to a capacitor to charge the capacitor and supplies the power supply voltage to the primary side control circuit when the primary side control circuit starts to operate. After the short-circuiting switch is changed to the ON state and the operation of the primary side control circuit stops, the power supply voltage is supplied through the starting resistor to the primary side control circuit so that the primary side control circuit and the switching element automatically start to operate.

An electrical apparatus according to the present invention comprises: the switching power supply device; and a secondary side circuit that is operated by means of a voltage supplied from the switching power supply device and has a voltage detection circuit and an operation abnormality detection circuit. The voltage detection circuit is adapted to detect an abnormal state of a voltage of a predetermined part provided in the secondary side circuit. The operation abnormality detection circuit is adapted to detect an abnormal state of an operation of the secondary side circuit. When the voltage detection circuit or the operation abnormality detection circuit detects an abnormal state, the detection circuit that detects the abnormal state transmits a control signal indicating the abnormal state to the switching power supply device.

BRIEF DESCRIPTION OF THE DRAWINGS

These and other features, objects and advantages of the present invention will become more apparent from the following description when taken in conjunction with the accompanying drawings wherein:

FIG. 2 is a flowchart showing operations of the switching power supply device when an abnormal condition occurs;

FIGS. 3A to 3E are diagrams showing signal waves of parts of the switching power supply device;

DETAILED DESCRIPTION OF THE PREFERRED EMBODIMENTS

Embodiments of the present invention are described below with reference to the accompanying drawings.

First Embodiment

Figure 1:
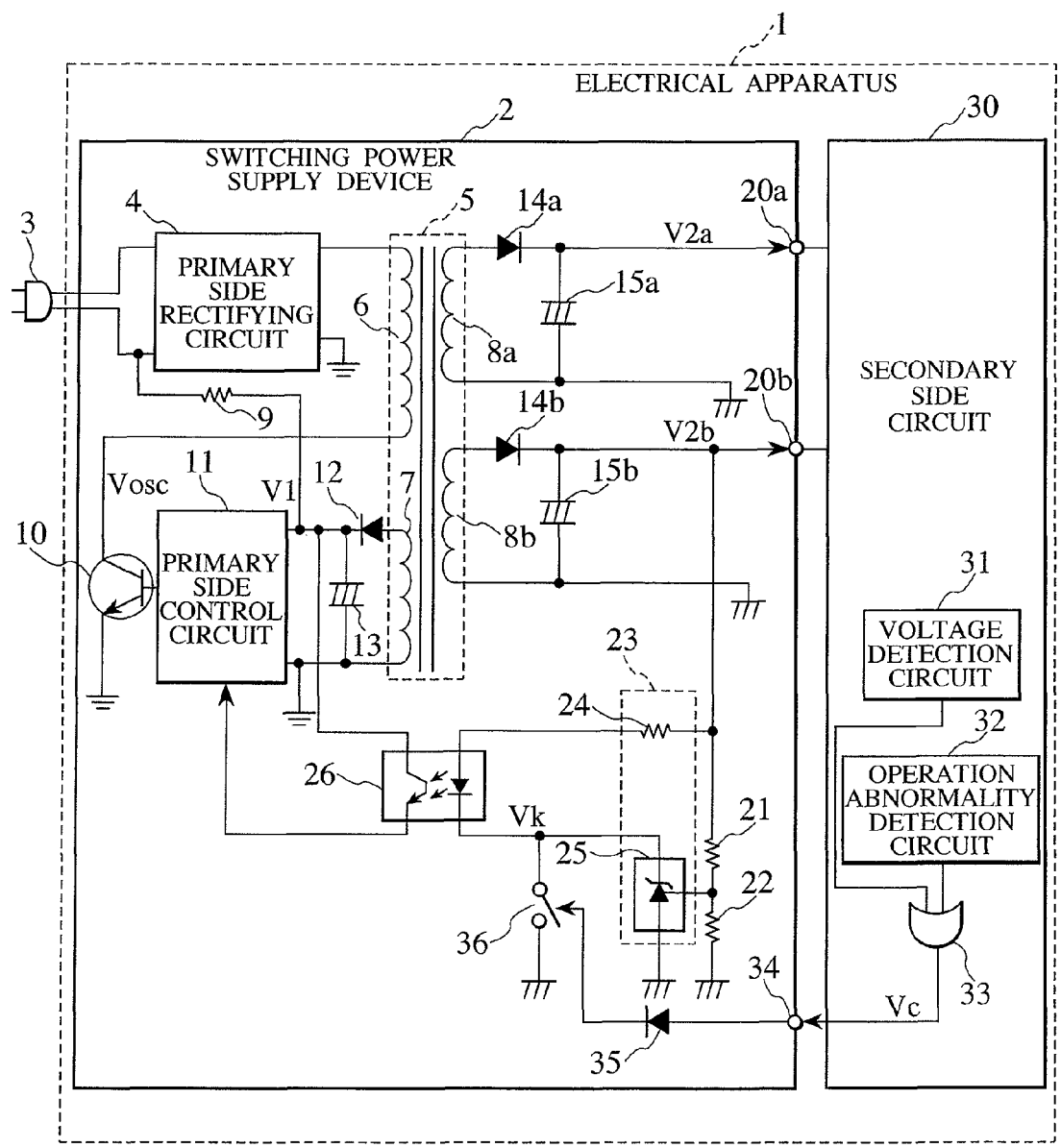
FIG. 1 is a diagram showing the configuration of an electrical apparatus including a switching power supply device according to a first embodiment of the present invention.

FIG. 1 is a diagram showing the configuration of an electrical apparatus including a switching power supply device according to a first embodiment of the present invention.

The electrical apparatus 1 is, for example, a monitoring apparatus that operates without an operator in many cases. The electrical apparatus 1 has a switching power supply device 2 adapted to convert input alternating current (AC) power into a direct current (DC) output voltage. The switching power supply device 2 supplies the DC output voltage to a secondary side circuit 30 that performs a monitoring operation. The configuration of the switching power supply device 2 is described below.

The electrical apparatus 1 has an AC plug 3. A primary side rectifier 4 smoothes an AC voltage input from the AC plug 3.

A primary side control circuit 11 causes a switching element 10 to perform an on-off operation to turn on and off the smoothed direct current voltage (or to perform an oscillation operation) in order that predetermined voltages V2 (V2a and V2b) are supplied to the secondary side circuit 30 through a transformer 5. The transformer 5 has a primary side main winding 6, a primary side auxiliary winding 7, and secondary side windings 8a and 8b. The primary side auxiliary winding 7 is adapted to supply a power supply voltage to the primary side control circuit 11. Each of the secondary side windings 8a and 8b is adapted to output a voltage. The present embodiment describes two output systems. A voltage induced by the primary side auxiliary winding 7 is rectified by a rectifying diode 12 and a rectifying capacitor 13, and then a voltage V1 is supplied to the primary side control circuit 11. A voltage induced by the secondary side winding 8a is rectified by a rectifying diode 14a and a rectifying capacitor 15a, and then a voltage V2a is supplied from a secondary side output terminal 20a to the secondary side circuit 30. A voltage induced by the secondary side winding 8b is rectified by a rectifying diode 14b and a rectifying capacitor 15b, and then a voltage V2b is supplied from a secondary side output terminal 20b to the secondary side circuit 30. A starting resistor 9 is adapted to supply a voltage to the primary side control circuit 11 when the primary side control circuit 11 starts to operate. The starting resistor 9 transfers the AC voltage input from the AC plug 3 to the rectifying capacitor 13 to charge the rectifying capacitor 13 allowing the primary side control circuit 11 to start to operate even when a voltage supplied from the primary side auxiliary winding 7 is not sufficient.

The switching power supply device 2 has a feedback circuit to stabilize the secondary side output voltages V2. The feedback circuit transmits, to the primary side control circuit 11, a deviation of the voltage V2b to be supplied to the secondary side output terminal 20b. The feedback circuit is composed of voltage dividing resistors 21 and 22, an error amplifier 23 and a photocoupler 26. The photocoupler 26 is an insulating element. The error amplifier 23 is composed of a current limiting resistor 24 and a shunt regulator 25. The shunt regulator 25 is a constant voltage control element. When the secondary side output voltage V2b increases to a level higher than a setting voltage, the error amplifier 23 amplifies the difference between the secondary side output voltage V2b and the setting voltage to increase a current flowing in the photocoupler 26, and the primary side control circuit 11 reduces an on-off ratio (duty ratio) of the switching element 10 to stabilize the secondary side output voltages V2.

In the present embodiment, the secondary side circuit 30 has a voltage detection circuit 31 and an operation abnormality detection circuit 32. The voltage detection circuit 31 is adapted to monitor a voltage of a predetermined part provided in the secondary side circuit 30 in order to detect an abnormal state (excessive voltage or low voltage). The operation abnormality detection circuit 32 is adapted to monitor an operation of the secondary side circuit 30 in order to detect an abnormal state or inoperativeness of the operation due to latch or the like. Specifically, the voltage detection circuit 31 is capable of detecting such abnormality that application of a voltage is stopped (for example, DC-DC converter IC for supplying a voltage to the secondary side circuit is stopped) in the secondary side circuit 30 due to an external environmental change (input of a surge voltage caused by thunder), noise coming from an external device, or the like. The operation abnormality detection circuit 32 is capable of detecting such abnormality that an operation of the electrical apparatus 1 is abnormal due to latch of a part (for example, a semiconductor part such as an LSI circuit) of the secondary side circuit 30. In addition, another abnormal detection circuit may be added to the secondary side circuit 30 and combined with the detection circuits 31 and 32 when necessary.

Furthermore, the switching power supply device 2 has a short-circuiting switch 36 for short-circuiting a part of the feedback circuit. A transistor or a field effect transistor (FET) may be used as the short-circuiting switch 36. The short-circuiting switch 36 short-circuits the part of the feedback circuit by means of a control signal of a high level (or low level in the case where the logic is opposite to the original one). The shunt regulator 25 has an anode and a cathode. In the present embodiment, the short-circuiting switch 36 is provided between the anode and cathode of the shunt regulator 25 for setting a feedback voltage supplied from the secondary side winding 8b.

In this configuration, when the voltage detection circuit 31 or the operation abnormality detection circuit 32 detects any abnormal state, an OR circuit 33 transfers a single control signal Vc (output from the detection circuit 31 or 32) indicating the abnormal state to a control signal input terminal 34 of the switching power supply device 2. The control signal Vc is then transferred from the control signal input terminal 34 through a backflow prevention diode 35 to the short-circuiting switch 36. The short-circuiting switch 36 is changed from an OFF state to an ON state to short-circuit the shunt regulator 25 (a cathode voltage Vk becomes zero). As a result, resistance of the feedback circuit becomes equal to resistance of the current limiting resistor 24. The feedback circuit becomes in a low resistant state. Then, an excessive current flows in the photocoupler 26. The primary side control circuit 11 then stops the oscillation operation of the switching element 10. Simultaneously, the voltages V2 of the secondary side windings 8a and 8b, and the voltage V1 of the primary side auxiliary winding 7, are quickly reduced to stop the operation of the primary side control circuit 11.

In the switching power supply device 2 according to the present embodiment, a charging current continuously flows from the AC plug 3 through the starting resistor 9 into to the primary side rectifying capacitor 13. As a result, the voltage V1 applied to the primary side control circuit 11 increases, and the primary side control circuit 11 restarts its operation and restarts the oscillation operation of the switching element 10. That is, it is possible to perform the operation equivalent to an on-off operation of the AC plug 3, automatically restart the switching power supply device 2, and supply the voltages V2 to the secondary side circuit 30 provided in the electrical apparatus 1.

Operations of the switching power supply device 2 according to the present invention are described below in detail.

FIG. 2 is a flowchart showing operations of the switching power supply device 2 according to the present embodiment when an abnormal condition occurs. FIGS. 3A to 3E are diagrams showing signal waves of the parts of the switching power supply device 2.

AC power is supplied from the AC plug 3 to the switching power supply device 2 in step S201. Then, the starting resistor 9 transfers the power supply voltage to the primary side control circuit 11 in order that the primary side control circuit 11 starts the oscillation operation of the switching element 10, in step S202. After the start of the oscillation operation, a voltage is supplied from the primary side auxiliary winding 7 to the primary side control circuit 11. When an oscillating current flows in the primary side main winding 6 provided in the transformer 5, the voltages V2a and V2b are respectively output from the secondary side auxiliary windings 8a and 8b to the secondary side circuit 30 to start an operation of the secondary side circuit 30.

The voltage detection circuit 31 provided in the secondary side circuit 30 monitors a voltage of the predetermined part provided in the secondary side circuit 30, and the operation abnormality detection circuit 32 provided in the secondary side circuit 30 monitors the operation of the secondary side circuit 30, in step S203. When any abnormal state is detected by the voltage detection circuit 31 or the operation abnormality detection circuit 32, the detection circuit outputs the control signal Vc indicating the abnormal state. That is, step S204 is performed to confirm whether or not the voltage detection circuit 31 detects that the voltage is reduced. Step S205 is performed to confirm whether or not the voltage detection circuit 31 detects that the voltage is excessive. Step S206 is performed to confirm whether or not the operation abnormality detection circuit 32 detects that the operation of the secondary side circuit 30 is abnormal. When any of the abnormal states is detected in steps S204 to S206, the secondary side circuit 30 transmits the control signal Vc to the switching power supply device 2 in step S207. FIG. 3A shows the control signal Vc. In FIG. 3A, when the abnormal state is detected at a time t1, the control signal Vc is set to the High level.

The control signal Vc indicating the abnormal state is transmitted to the short-circuiting switch 36 provided in the switching power supply device 2 in step S208. The short-circuiting switch 36 is switched to the ON state to short-circuit a part (the shunt regulator 25 in the present embodiment) of the feedback circuit. FIG. 3B shows a change of the cathode voltage Vk of the shunt regulator 25. When the anode and cathode of the shunt regulator 25 are short-circuited, the feedback circuit cannot maintain a normal setting voltage, and the cathode voltage Vk is quickly reduced to the ground potential.

Since the feedback voltage (cathode voltage Vk) is quickly reduced, the voltage V2a of the secondary side winding 8a (provided in the transformer 5) and the voltage V2b of the secondary side winding 8b (provided in the transformer 5) are quickly reduced in step S209. Simultaneously, the voltage V1 of the primary side auxiliary winding 7 is also quickly reduced. FIG. 3C shows a change of the voltages V2 of the secondary side windings. FIG. 3D shows a change of the voltage V1 of the primary side auxiliary winding 7.

Since the voltage V1 of the primary side auxiliary winding 7 is quickly reduced, a voltage supplied to the primary side control circuit 11 becomes insufficient, and the operation of the primary side control circuit 11 stops in step S210. As a result, the oscillation operation of the switching element 10 also stops. FIG. 3D shows the voltage V1 of the primary side auxiliary winding 7. In FIG. 3D, the voltage V1 of the primary side auxiliary winding 7 is reduced to a level lower than a threshold level Vth necessary for the operation of the primary side control circuit 11 at a time t2. FIG. 3E shows an oscillation wave Vosc of the switching element 10. The oscillation operation of the switching element 10 stops at a time t2.

Since the primary side (provided in the transformer 5) oscillation operation stops, a voltage is not induced by each of the secondary side windings 8a and 8b. The operation of the secondary side circuit 30 stops. As shown in FIG. 3C, the voltages V2 of the secondary side windings are reduced to zero. Thus, the control signal Vc (indicating the abnormal state) transmitted from the voltage detection circuit 31 or the operation abnormality detection circuit 32 stops (is changed from the High level to the Low level) as shown in FIG. 3A. Therefore, the secondary side circuit 30 becomes the same state as that of the secondary side circuit 30 in the case where the AC power supply is cut.

Since the voltages V2 supplied to the secondary side circuit 30 are reduced to zero and the operation of the secondary side circuit 30 stops, charges accumulated in a circuit part such as an integrated circuit are removed. As a result, the voltage of the secondary side circuit 30 or the operation of the secondary side circuit 30 is recovered from the abnormal state including a latched state, and the entire secondary side circuit 30 is reset to an initial state, in step S211.

After the entire secondary side circuit 30 is reset, the process proceeds back to step S202. The voltage V1 of the primary side auxiliary winding 7 reaches a voltage level VL shown in FIG. 3D at the time t3. At the time t3, the charging current flows from the AC power supply through the starting resistor 9 into the primary side rectifying capacitor 3, and the voltage V1 supplied to the primary side control circuit 11 starts to increase. This is the same operation as that when the AC power is supplied from the AC plug 3.

When the voltage V1 reaches the threshold level Vth necessary for the operation of the primary side control circuit 11 at a time t4, the operation of the primary side control circuit 11 starts, and the switching element 10 starts the on-off operation. FIG. 3E shows that the oscillation operation of the primary side circuit restarts at the time t4. An oscillation stop period from the time 2 to the time 4 is determined based on a time constant of a charging circuit. The oscillation stop period is approximately 1 sec. This does not adversely affect the practical use. Therefore, the switching power supply device 2 can immediately automatically restart without another control signal for restarting the primary side circuit.

Since the switching power supply device 2 restarts, the secondary side output voltages V2 restarts to be supplied. However, since the secondary side circuit 30 is in a completely reset state, the secondary side circuit 30 and the electrical apparatus 1 restart to operate from their original normal state. When an abnormal state of the voltage or operation of the secondary side circuit 30 is redetected during the operations (of the secondary side circuit 30 and the electrical apparatus 1) after the restart of the secondary side circuit 30 and the electrical apparatus 1, the process proceeds back to step S203 and the primary side circuit stops and restarts.

According to the present embodiment, when an abnormal state is detected in the electrical apparatus due to latch or the like, the switching power supply device automatically stops the oscillation operation and automatically restarts. It is therefore unnecessary for a user to operate the electrical apparatus. In addition, not only an abnormal state of a voltage in the electrical apparatus, but also an abnormal state of an operation of the electrical apparatus due to a cause other than the voltage can be detected according to the present embodiment. Therefore, the apparatus is user-friendly, and this technique is effective for an apparatus operating without an operator, such as a monitoring apparatus. The switching power supply device according to the present embodiment can be simply configured with the short-circuiting switch added. This can suppress an increase in the cost of manufacturing the device.

When the cause of the abnormal state is a failure of or damage to a part of the circuit, the series of return operations are repeated unless the cause of the abnormal state is removed. However, since the primary side circuit temporarily stops, the state of the apparatus is temporarily recovered from the abnormal state. The abnormal state is not continuous. This prevents an abnormal part or a part located near the abnormal part from being heated due to continuity of the abnormal state of the apparatus thereby enhancing safety of the apparatus.

Second Embodiment

Figure 4:
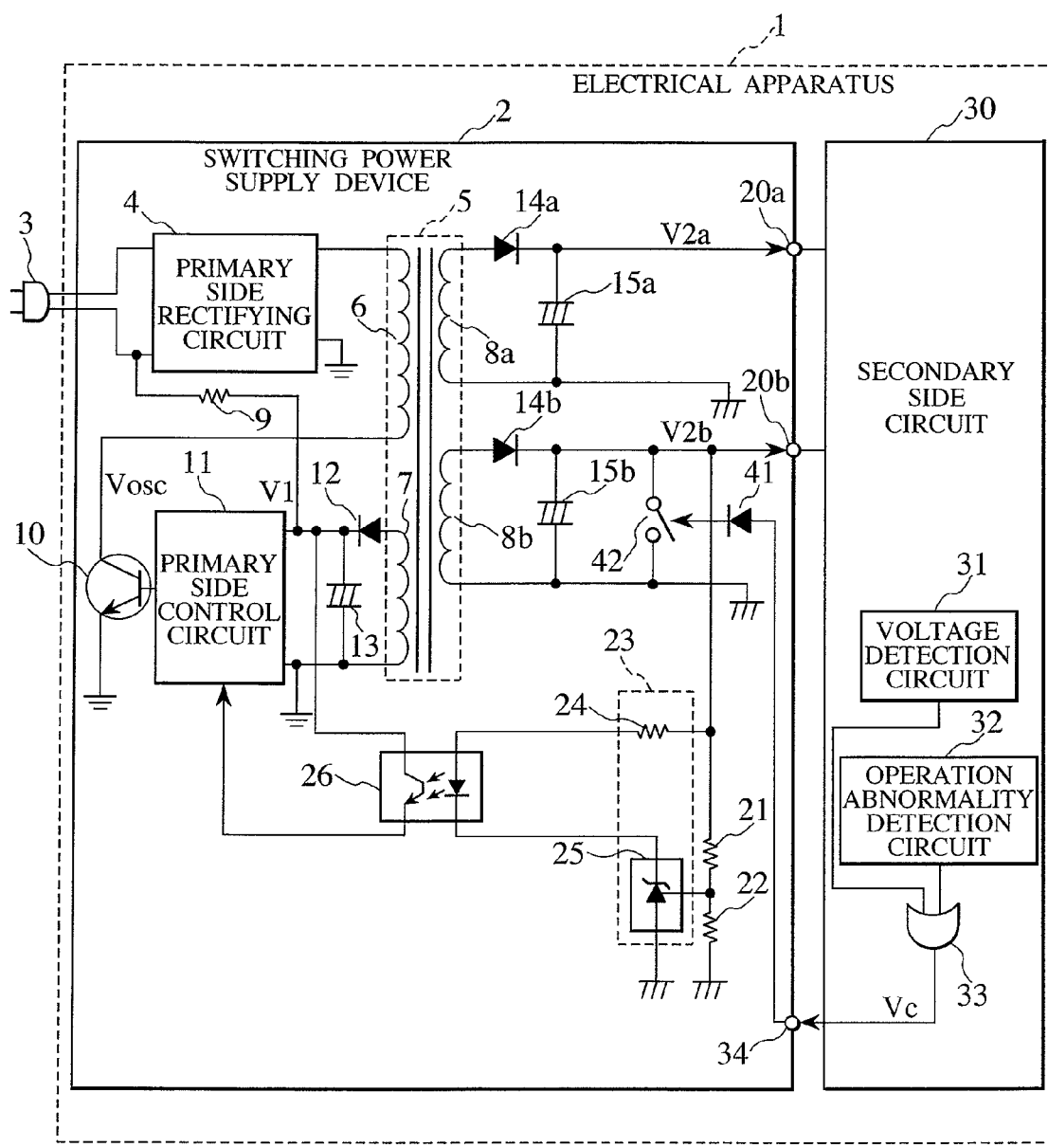
FIG. 4 is a diagram showing the configuration of an electrical apparatus including a switching power supply device according to a second embodiment of the present invention.

FIG. 4 is a diagram showing the configuration of an electrical apparatus including a switching power supply device according to a second embodiment of the present invention.

In the second embodiment, the secondary side circuit 30 has the voltage detection circuit 31 and the operation abnormality detection circuit 32, like in the first embodiment. The voltage detection circuit 31 is adapted to detect an abnormal state of the voltage of the predetermined part provided in the secondary side circuit 30. The operation abnormality detection circuit 32 is adapted to detect an abnormal state or inoperativeness of the operation of the secondary side circuit 30. In the second embodiment, a short-circuiting switch 42 is provided between both ends of the rectifying capacitor 15b connected with the secondary side winding 8b, and adapted to short-circuit a part of the feedback circuit in the switching power supply device 2. The short-circuiting switch 42 is not present in the first embodiment.

In this configuration according to the present embodiment, when the voltage detection circuit 31 or the operation abnormality detection circuit 32 detects an abnormal state, the control signal Vc indicating the abnormal state is transmitted from the detection circuit through a backflow prevention diode 41 to the short-circuiting switch 42. The short-circuiting switch 42 is then changed from an OFF state to an ON state to short-circuit the rectifying capacitor 15b and quickly reduce the secondary side output voltage V2b. Along with this, the voltage V1 of the primary side auxiliary winding 7 (and the secondary side output voltage V2a) is quickly reduced to stop operation of the primary side control circuit 11 and the oscillation operation of the switching element 10.

After that, a charging current flows from the AC plug 3 through the starting resistor 9 into the primary side rectifying capacitor 13, like in the first embodiment. The voltage V1 supplied to the primary side control circuit 11 then increases. The operation of the primary side control circuit 11 and the operation of the switching element 10 restart. In the present embodiment, it is possible to perform the operation equivalent to the on-off operation of the AC plug 3, and automatically restart the switching power supply device 2.

Third Embodiment

Figure 5:
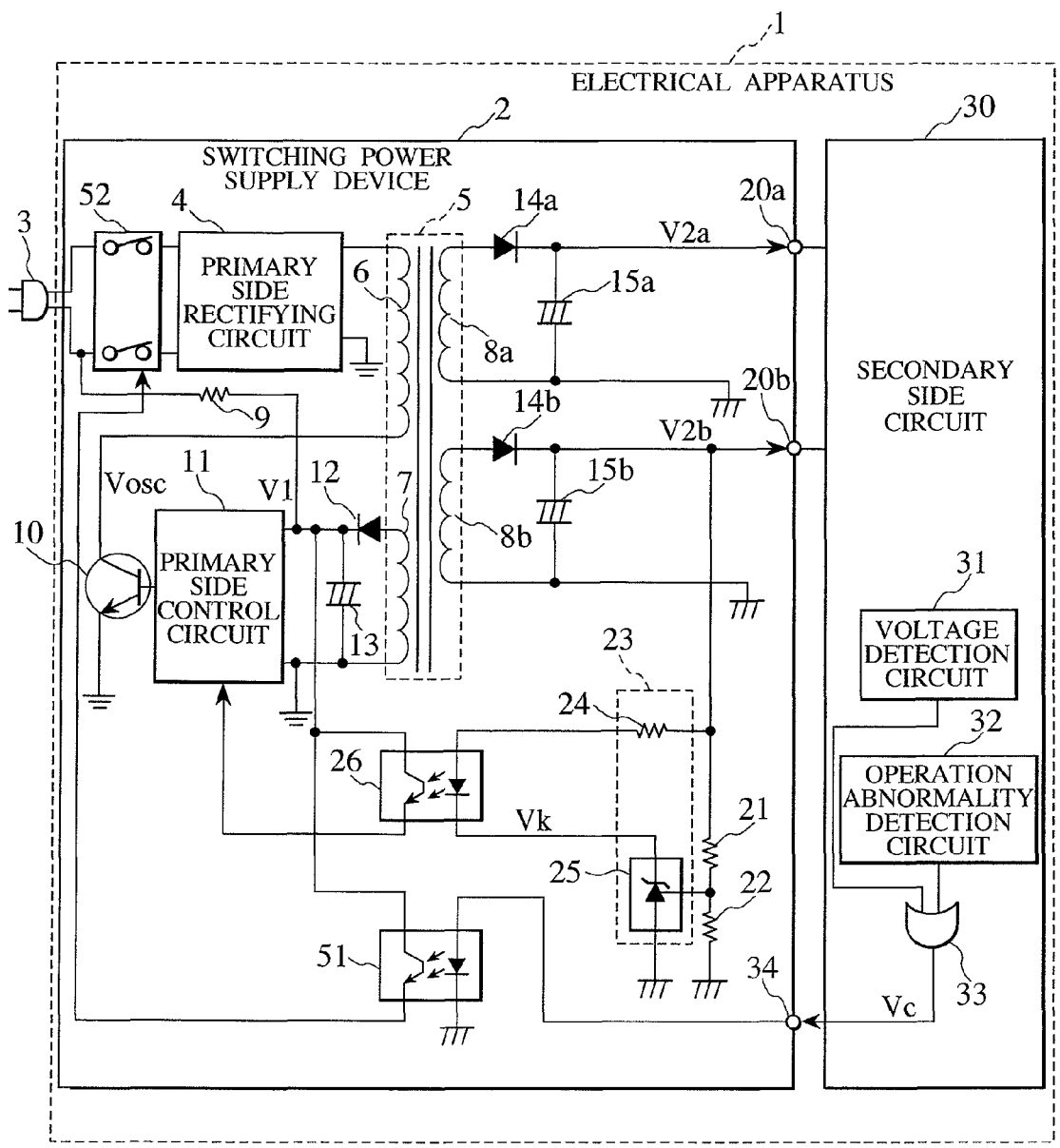
FIG. 5 is a diagram showing the configuration of an electrical apparatus including a switching power supply device according to a third embodiment of the present invention.

FIG. 5 is a diagram showing the configuration of an electrical apparatus including a switching power supply device according to a third embodiment of the present invention.

In the third embodiment, the secondary side circuit 30 has the voltage detection circuit 31 and the operation abnormality detection circuit 32, like in the first and second embodiments. The voltage detection circuit 31 is adapted to detect an abnormal state of the voltage of the predetermined part provided in the secondary side circuit 30. The operation abnormality detection circuit 32 is adapted to detect an abnormal state or inoperativeness of the operation of the secondary side circuit 30. In the third embodiment, a part of the feedback circuit is not short-circuited in the switching power supply device 2, unlike in the first and second embodiments. An AC relay switch 52 is provided on the upstream side of the primary side rectifier 4 to cut off the AC power supplied from the AC plug 3 in the third embodiment. The AC relay switch 52 is controlled by means of a signal supplied from a photocoupler 51 provided in the third embodiment.

In this configuration, when the voltage detection circuit 31 or the operation abnormality detection circuit 32 detects an abnormal state, the control signal Vc indicating the abnormal state is transmitted from the detection circuit through the photocoupler 51 to the AC relay switch 52. The AC relay switch 52 is then changed from an ON state to an OFF state to cut off a voltage to be applied to the primary side main winding 6 and thereby stop the application of the voltage V1 of the primary side auxiliary winding 7 and the application of the secondary side output voltages V2a and V2b. Then, the operation of the primary side circuit and the operation of the secondary side circuit 30 stop.

After that, a charging current flows from the AC plug 3 through the starting resistor 9 into the primary side rectifying capacitor 13, like in the first and second embodiments. The voltage applied to the primary side circuit 11 increases. The operation of the first side control circuit 11 and the operation of the switching element 10 restart. Before the operation of the first side control circuit 11 and the operation of the switching element 10 restart, the control signal Vc to be transmitted to the AC relay switch 52 is in an OFF state. Therefore, after the operation of the first side control circuit 11 and the operation of the switching element 10 restart, the AC relay switch 52 is changed to an ON state. In the third embodiment, it is possible to perform the operation equivalent to the on-off operation of the AC plug 3, and automatically restart the switching power supply device 2.

In each of the first to third embodiments, the AC-DC switching power supply device capable of receiving AC power and outputting a DC voltage is described. The present invention, however, can be applied to a DC-DC switching power supply device capable of receiving DC power and outputting a DC voltage.

According to the present invention, the switching power supply device can be provided at low cost and is capable of automatically restarting the electrical apparatus without a user operation when an abnormal condition occurs in the electrical apparatus.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A switching power supply device comprising:
a switching element which performs an on-off operation to turn on and off a direct current voltage to be applied to a primary side main winding;
a primary side control circuit which controls the on-off operation of the switching element;
a transformer having the primary side main winding, a secondary side winding and a primary side auxiliary winding, the secondary side winding being adapted to induce a voltage that is to be rectified and output to a secondary side circuit from the switching power supply device, the primary side auxiliary winding being adapted to supply a power supply voltage to the primary side control circuit;
a feedback circuit which transmits a deviation of the voltage induced by the secondary side winding to the primary side control circuit; and
a short-circuiting switch which short-circuits a part of the feedback circuit;
wherein when an abnormal condition occurs in the secondary side circuit, the short-circuit switch is changed to an ON state to reduce a voltage induced by the primary side auxiliary winding and stop an operation of the primary side control circuit and an operation of the switching element.

2. The switching power supply device according to claim 1, further comprising:
a starting resistor which transfers an input power supply voltage to a capacitor to charge the capacitor and supplies the power supply voltage to the primary side control circuit when the primary side control circuit starts to operate, wherein
after the short-circuiting switch is changed to the ON state and the operation of the primary side control circuit stops, the power supply voltage is supplied through the starting resistor to the primary side control circuit so that the primary side control circuit and the switching element automatically start to operate.

3. The switching power supply device according to claim 1, wherein
the feedback circuit has a shunt regulator for setting a feedback voltage supplied from the secondary side winding, and
the short-circuiting switch is provided between an anode of the shunt regulator and a cathode of the shunt regulator.

4. The switching power supply device according to claim 1, wherein
the short-circuiting switch is provided between both ends of a capacitor for rectifying a voltage of the secondary side winding.

5. An electrical apparatus comprising:
the switching power supply device according to claim 1; and
a secondary side circuit operated by means of a voltage supplied from the switching power supply device and including a voltage detection circuit and an operation abnormality detection circuit, the voltage detection circuit being adapted to detect an abnormal state of a voltage of a predetermined part provided in the secondary side circuit, and the operation abnormality detection circuit being adapted to detect an abnormal state of an operation of the secondary side circuit, wherein
when the voltage detection circuit or the operation abnormality detection circuit detects an abnormal state, the detection circuit that detects the abnormal state transmits a control signal indicating the abnormal state to the switching power supply device.

6. A switching power supply device comprising:
a relay switch which cuts off power to be input to the switching power supply device;
a switching element which performs an on-off operation to turn on and off a direct current voltage to be applied to a primary side main winding;
a primary side control circuit which controls the on-off operation of the switching element;
a transformer having the primary side main winding, a secondary side winding and a primary side auxiliary winding, the secondary side winding being adapted to induce a voltage that is to be rectified and output to a secondary side circuit from the switching power supply device, the primary side auxiliary winding being adapted to supply a power supply voltage to the primary side control circuit;
a starting resistor which transfers an input power supply voltage to a capacitor to charge the capacitor and supplies the power supply voltage to the primary side control circuit when the primary side control circuit starts to operate; and
a feedback circuit which transmits a deviation of the voltage induced by the secondary side winding to the primary side control circuit;
wherein when an abnormal condition occurs in the secondary side circuit, the relay switch is set to an OFF state to stop an application of a voltage induced by the primary side auxiliary winding and stop an operation of the primary side control circuit and an operation of the switching element, and wherein after the operation of the primary side control circuit and the operation of the switching element stop, the power supply voltage is supplied through the starting resistor to the primary side control circuit to ensure that the primary side control circuit and the switching element automatically start to operate.

7. An electrical apparatus comprising:

the switching power supply device according to claim 6; and a secondary side circuit operated by means of a voltage supplied from the switching power supply device and including a voltage detection circuit and an operation abnormality detection circuit, the voltage detection circuit being adapted to detect an abnormal state of a voltage of a predetermined part provided in the secondary side circuit, and the operation abnormality detection circuit being adapted to detect an abnormal state of an operation of the secondary side circuit, wherein when the voltage detection circuit or the operation abnormality detection circuit detects an abnormal state, the detection circuit that detects the abnormal state transmits a control signal indicating the abnormal state to the switching power supply device.

* * * * *